(12) United States Patent
Mraz et al.

(10) Patent No.: US 8,353,989 B2
(45) Date of Patent: Jan. 15, 2013

(54) APPARATUS AND METHOD FOR TREATING, PRESSING AND WASHING BIOMASS

(75) Inventors: Peter Mraz, Klosterneuburg (AT); Thomas Pschorn, Lennoxville (CA); Bertil Stromberg, Diamond Point, NY (US); NamHee Shin, Clifton Park, NY (US)

(73) Assignee: Andritz Inc., Glens Falls, NY (US)

( * ) Notice: Subject to any disclaimer, the term of this patent is extended or adjusted under 35 U.S.C. 154(b) by 694 days.

(21) Appl. No.: 12/503,617

(22) Filed: Jul. 15, 2009

(65) Prior Publication Data
US 2010/0116267 A1   May 13, 2010

Related U.S. Application Data

(60) Provisional application No. 61/112,849, filed on Nov. 10, 2008.

(51) Int. Cl.
*B01J 3/00* (2006.01)
*C13K 1/02* (2006.01)

(52) U.S. Cl. .............. 127/1; 127/25; 100/116; 100/127; 100/295

(58) Field of Classification Search ................ 127/1, 25, 127/37; 100/37, 116, 127, 295
See application file for complete search history.

(56) References Cited

U.S. PATENT DOCUMENTS
4,036,359 A * 7/1977 Strickland, Jr. ................ 100/37
4,630,535 A * 12/1986 Haygreen ..................... 100/127

FOREIGN PATENT DOCUMENTS
WO   2007/051269   5/2007

* cited by examiner

*Primary Examiner* — David A Reifsnyder
(74) *Attorney, Agent, or Firm* — Nixon & Vanderhye P.C.

(57) ABSTRACT

A biomass cooking device including: a treatment vessel having an biomass inlet adapted to receive biomass material to a processing chamber of the vessel, a biomass outlet adapted to discharge from the processing chamber the biomass material processed in the vessel, an extraction region of the vessel and a liquids outlet to the extraction region to discharge dissolved hemi-cellulosic material extracted from the biomass material in the processing chamber; a piston press in the cooking vessel defining a moveable wall of the processing chamber, wherein the piston press moves to reduce the processing chamber and thereby compress the biomass material; and a screen plate in the vessel forming a barrier between the processing chamber and an extraction region of the vessel, the screen plate having apertures to pass the dissolved hemi-cellulosic material through the screen plate from the processing chamber to the extraction region.

14 Claims, 9 Drawing Sheets

APPARATUS AND METHOD FOR TREATING, PRESSING AND WASHING BIOMASS

RELATED APPLICATION

This application claims the benefit of U.S. Provisional Patent Application Ser. No. 61/112,849 filed on Nov. 10, 2008, the entirety of which is incorporated by reference.

BACKGROUND OF THE INVENTION

The present invention relates to pre-treatment of cellulosic biomass feedstocks such as: agricultural residues, e.g., corn stalks, corn stover, hulls, cereal straws; energy plants, e.g., high yielding grasses including switch grass, miscanthus and energy cane; and forest and sawmill residues, e.g., wood chips and shredded thinnings. The pre-treatment includes pre-hydrolysis and possibly steam explosion to extract the carbon sugars for the further production of bio-fuels and chemicals. The pretreatment process may be followed by other conventional treatments, such as generation of alcohol for biofuels or other chemicals.

Pre-hydrolysis and auto-hydrolysis typically refer to cooking cellulosic biomass feedstocks at temperatures of, for example, 110 to 190 degrees Celsius (° C.) for approximately 10 to 60 minutes (min.), where an acid solution in the vessel dissolves and hydrolyses hemi-cellulose in the feedstock to C5 sugars (such as xylose and arabinose), as well as amorphous C6 sugars. The pre-hydrolysis and auto-hydrolysis of soft-wood hemi-cellulose generally results in mostly glucomannan being dissolved and hydrolyzed. Mild acids, $SO_2$-gas, oxygen, compressed air, ammonia or other catalyzing agents may be added to the cooking vessel to enhance the hydrolysis of hemi-cellulose

SUMMARY OF INVENTION

The invention may be applied as to dissolve and extract hemi-cellulose from biomass feedstock, which are mainly 5-carbon sugars (referred to as "C5-sugars") in hardwoods and grasses. Dissolving and extracting hemi-cellulose in a pre-hydrolysis reactor vessel allows the remaining biomass feedstock to subsequently undergo a flash hydrolysis process, typically referred to as a steam explosion process, in a steam gun. Removing at least a portion of the C5 sugars before the remaining biomass undergoes flash hydrolysis enhances the alcohol yield from the flash hydrolysis process. The C5-sugars separated and removed from the pre-hydrolysis reactor may be recovered and converted to, for example: xylitol and other food additives; biogas, using aerobic or anaerobe fermentation; methyl-furan (such as high octane oxygenate), and to an aqueous sugar for conversion to alcohols (e.g. ethanol) through special micro-organisms.

At high pressures and temperatures, in conventional pre-treatments that generate alcohols, e.g. ethanol, from biomass cellulosic feed-stocks, C5-sugars are converted to components that remain in the feedstock and undesirably inhibit the fermentation of C6-sugars in the following fermentation step. Removing C5-sugars during pretreatments reduces the formation of inhibitors to fermentation, such as aldehydes, e.g., furfural, formaldehyde; monomeric phenolics, e.g., vanillin and coniferylaldehyde; and acids, e.g., acetic acid and formic acid. Because of the reduction in inhibitors, the C6-sugar fermentation process, following the extraction of C5-sugars, should enjoy an enhanced alcohol yield. In addition to enhancing alcohol production processes for biofuels generation, the hydrolysis reactions with C5-sugar extraction may be used in other chemical processes, such as chemical pulping processes where a separation of cooking stages with an intermediate washing stage or pressing stage is used or would be beneficial.

One embodiment of the invention is a biomass cooking device including: a treatment vessel having a biomass inlet adapted to receive biomass material to a processing chamber of the vessel, a biomass outlet adapted to discharge from the processing chamber the biomass material processed in the vessel, an extraction region of the vessel and a liquids outlet to the extraction region to discharge dissolved hemi-cellulosic material extracted from the biomass material in the processing chamber; a piston press in the cooking vessel defining a moveable wall of the processing chamber, wherein the piston press moves to reduce the processing chamber and thereby compress the biomass material; and a screen plate in the vessel forming a barrier between the processing chamber and an extraction region of the vessel, the screen plate having apertures to pass the dissolved hemi-cellulosic material through the screen plate from the processing chamber to the extraction region.

The invention may be further embodied as a biomass treatment device comprising: a cylindrical treatment vessel having a biomass inlet adapted to receive biomass material into a processing chamber of the vessel, a biomass outlet adapted to discharge from the processing chamber the biomass material processed in the vessel, and a liquids outlet adapted to discharge from an extraction region of the vessel dissolved hemi-cellulosic material extracted from the biomass material in the processing chamber; a piston in the treatment vessel and forming a moveable end to the processing chamber, wherein the piston moves to reduce a volume of the processing chamber and thereby compress the biomass material in the processing chamber; a screen plate in the vessel between the processing chamber and the extraction region, wherein the screen plate has apertures to pass the dissolved hemi-cellulosic material from the processing chamber to the extraction region.

A further embodiment of the invention is a method to process cellulosic material in a treatment vessel comprising: introducing the cellulosic material to a processing chamber of the vessel; adding heat energy or pressure to the vessel to hydrolyze the cellulosic material in the processing chamber and dissolve hemi-cellulosic from the cellulosic material; compressing the cellulosic material with a pressing device advancing in the vessel to reduce a volume of the processing section; extracting the dissolved hemi-cellulosic material through a screen from the processing section; draining the extracted hemi-cellulosic material from the vessel; discharging the cellulosic material from the vessel separately from the extracted hemi-cellulosic material.

DETAILED DESCRIPTION OF THE INVENTION

Figure 1:
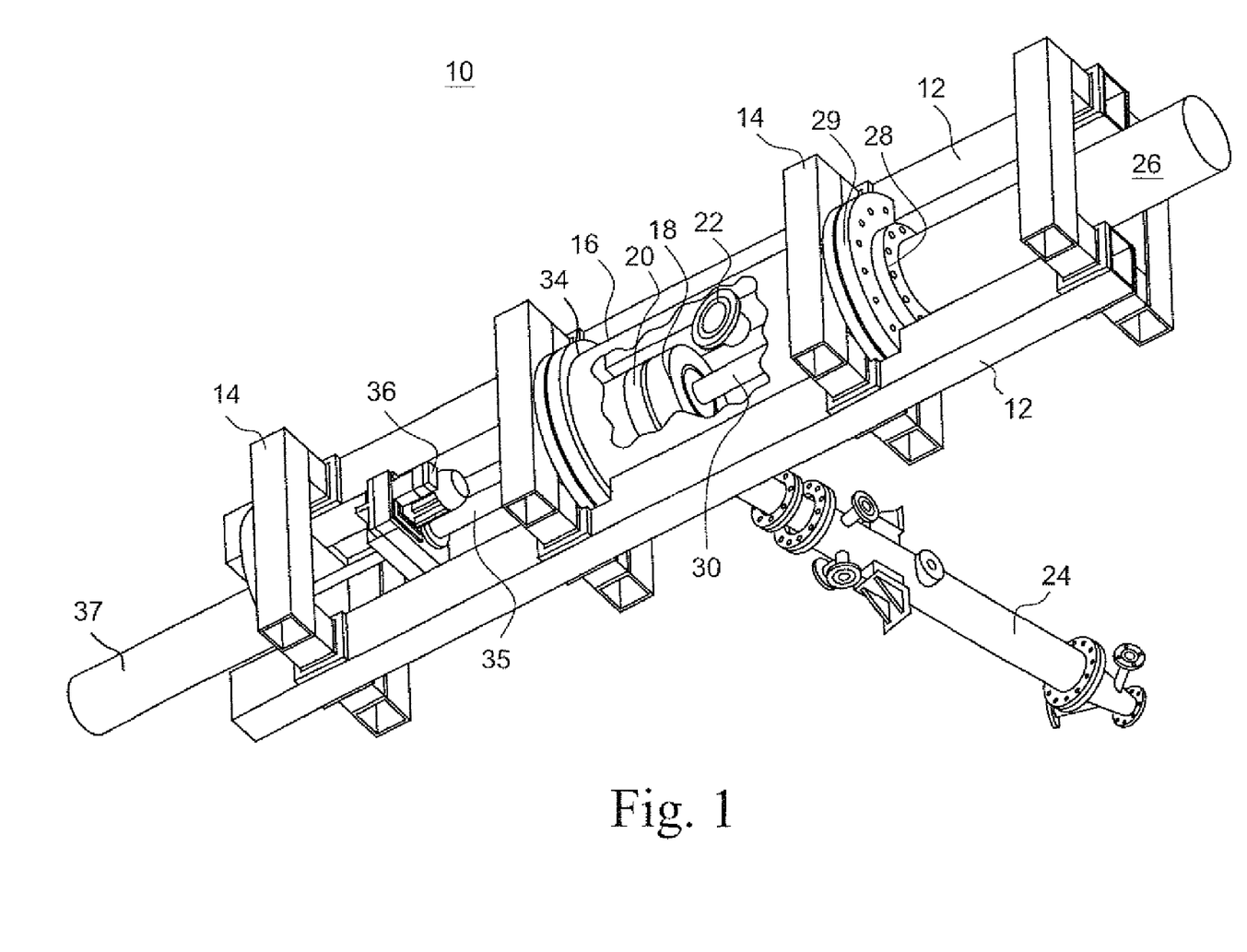
FIG. 1 is a perspective view of the top and front of a biomass treatment device.
Figure 2:
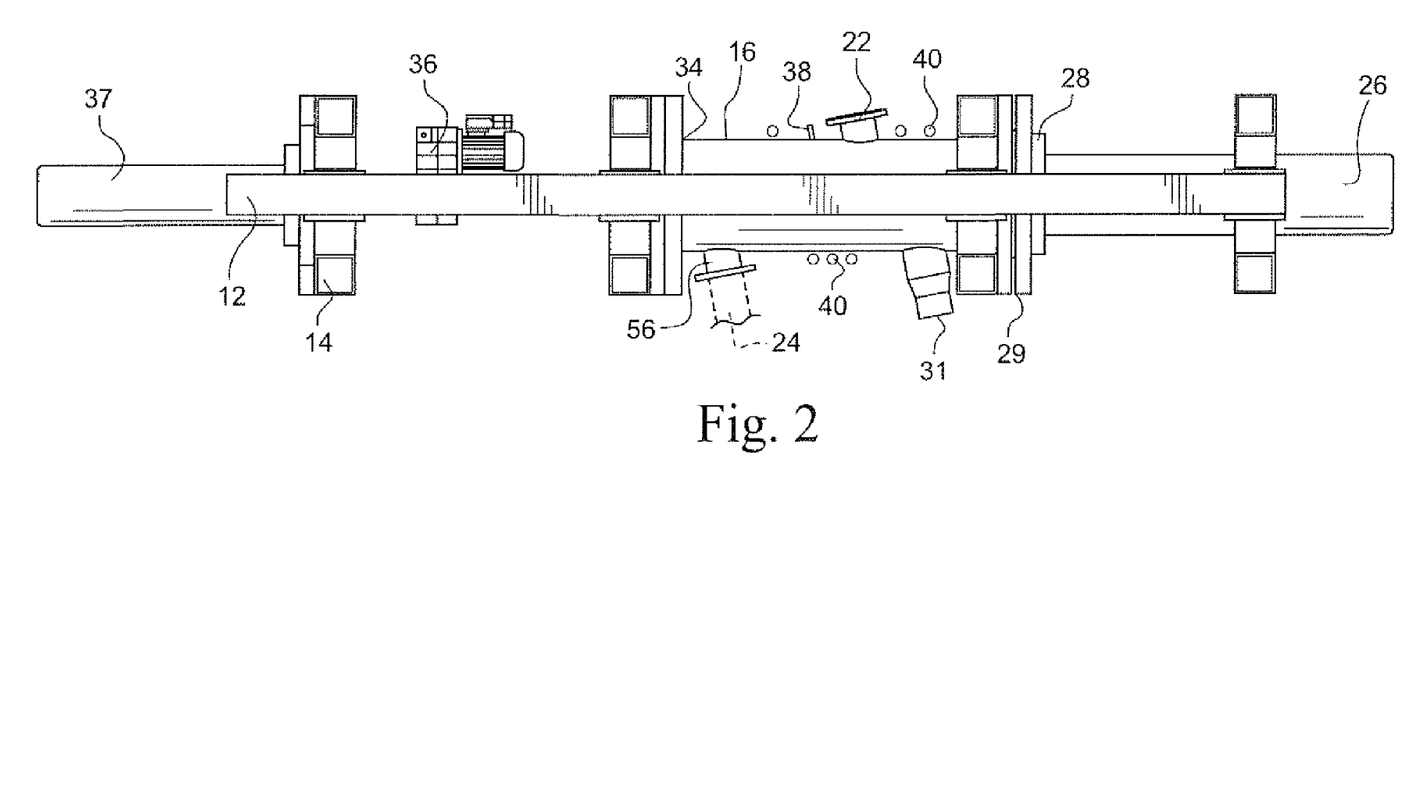
FIG. 2 is a side view of the biomass treatment device shown in FIG. 1.

FIG. 1 shows a perspective view and FIG. 2 shows a side view of a biomass treatment device 10 mounted between horizontal support beams 12 and cross-beams 14. The device 10 includes a generally cylindrical treatment vessel 16 which is shown as being partially cut away, for purposes of illustration. A piston press 18 and a mixer 20 are inside the vessel. A raw material feed inlet 22 receives batches of biomass feedstock from a bin, chute or other feeding device. The biomass treatment device 10 may operate in batch mode in which biomass feedstock is sequentially fed to the treatment vessel, processed in the treatment vessel, and discharged from the vessel before another batch of biomass feedstock is fed to the inlet 22. The biomass treatment device may also be alternatively operated in a semi-continuous mode. The processed biomass is discharged from the vessel to a steam-gun 24, a high-pressure reactor or other processing device.

The biomass treatment vessel 16 may be oriented horizontally, inclined or vertically. For example, the biomass treatment vessel may be oriented at an incline, e.g., between three to five degrees, such that a first end 29 of the vessel 16 is at a lower elevation than a second end 34 to promote drainage of dissolved hemi-cellulosic material, e.g., C5 sugars, from a discharge drain 31. A pressing hydraulic cylinder 26 is coaxial with the treatment vessel, and is attached at a flange 28 to the first end 29 of the treatment vessel. The pressing hydraulic cylinder includes a shaft 30, coaxial to the treatment vessel that extends into the vessel and is attached to the piston press 18, e.g., a cylindrical piston head with a screen plate as the circular front surface. The hydraulic cylinder extends the shaft 30 to move the piston press 18 axially in the treatment vessel away from the first end 29 of the treatment vessel.

The biomass in the treatment vessel is compressed into a disc shape, referred to as a "cookie", as the piston press moves to the opposite end 34 of the vessel. When pressed into a cookie the biomass is a compact mass. To breakup the cookie, the piston press is retracted towards the first end 29 of the treatment vessel and mixing paddles 50 (FIG. 3) of the mixer 20 extend axially into the processing chamber. The paddles rotate and are moved axially to "fluff" the biomass cookie crumbling the cookie into pieces. A shaft 35 of the mixer 20 extends from the second end 34 to a rotating drive 36 such as an electric motor with a gear reduction transmission or a hydraulic motor. The rotating drive 36 and shaft 35 are moved axially by a mixer hydraulic cylinder 37 that positions the mixing device axially in the vessel.

Pressure and heat energy may be added to the treatment vessel 16 through a steam inlet 38. The treatment vessel may be heated through direct steam injection, such as a single or multiple port steam injection system, through a separate heat jacket 40 (steam or electric) or a combination of both direct steam injection and a heat jacket. The treatment vessel may be operated at a variety of pressures and temperatures which will typically be selected by the operator and depend on the processes occurring in the vessel. For example, the vessel 16 may be operated at temperatures in a range of 110 to 200 degrees Celsius, 110 to 170 degrees Celsius or 180 to 185 degrees Celsius. The vessel may operate at pressures up to 10 bar gauge (10 bar above atmospheric pressure) or more and, by way of example, in a pressure range of 1.5 to 8 bar gauge.

The biomass feedstock may be subjected to one or more processing steps, e.g., pre-hydrolysis, auto-hydrolysis and washing. During or between each step the biomass may be compressed into a cookie, dissolved hemi-cellulosic material or wash liquid may be extracted and drained, and the compressed biomass fluffed. The biomass feedstock may be maintained in the treatment vessel 16 for a period of time, e.g., about 10 to 60 minutes, depending on the process(es) performed on the feedstock and selected by the operator. Mild acids, $SO_2$-gas, oxygen, compressed air, ammonia or other catalyzing agents may be added optionally to the biomass feed stock as it enters the treatment vessel through feed inlet 22, through the steam inlet port 38 or through a chemical injection port(s). The treatment vessel may also support auto-hydrolysis processing of the biomass feedstock, such as using wood acids released by the feedstock while the vessel is maintained at auto-hydrolysis conditions.

Figure 3:
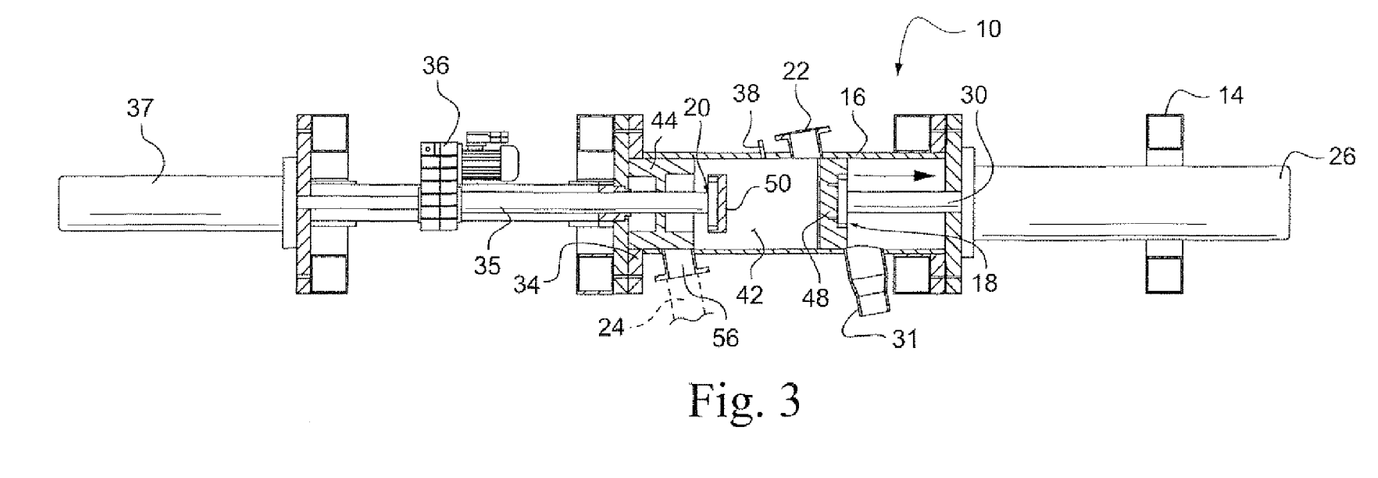
FIGS. 3 to 5 are views of the biomass treatment device shown in FIG. 1, wherein the cooking vessel is shown in cross-section and the mixer and piston head are at various operational positions in the treatment vessel.

FIG. 3 shows the biomass cooking device 10 with the treatment vessel 16 shown in cross-section and the mixer 20 and piston press 18 are positioned in the vessel for processing the biomass feedstock in the processing chamber of the vessel. The amount of biomass feedstock fed to the vessel depends on the volume of the processing chamber 42, which is between the front surface, e.g., screen plate, of the piston press 18 and at the front of an annular sealing seat 44 at the second end 34 of the vessel.

By way of example, the processing chamber may receive a volume of biomass feedstock between 50 kilograms per meter cubed ($kg/m^3$) and 200 $kg/m^3$. The volume capacity of the vessel is dependent on the size and other design selections made in making the treatment device.

The piston head 48 of the piston press 18 is attached to and retracted by a shaft 30 which is moved by the hydraulic cylinder. Retracting the piston head opens the inlet 22 so that biomass feedstock may flow into the processing chamber 42 of the vessel. The piston press 18 may be used as a valve to close and open the biomass inlet 22. The arrow in FIG. 3 shows the piston head retracted to open the inlet 22. Alternatively, a valve may be arranged on the inlet 22 to regulate biomass feedstock entering the vessel.

FIG. 3 shows the biomass treatment device 10 with the treatment vessel 16 shown in cross-section and the mixer 20 and piston press 18 are positioned for biomass feedstock input through inlet 22. The processing chamber 42 receives the biomass feedstock through the inlet 22. Heat energy, such as low pressure steam at up to 10 bar and 180 degrees C., may be added through the steam inlet 38. Chemical additives, wash liquid and liquor may be provided through the steam inlet 38 to the processing chamber. The recipe, e.g., time schedule and amounts, for adding biomass feedstock, steam, chemical additives, wash liquid and liquor, as well as the temperatures and pressures to be maintained in the vessel and the schedule for moving the piston press and mixing device is selected by the operator and dependent on the processes to be performed on the biomass.

Figure 4:
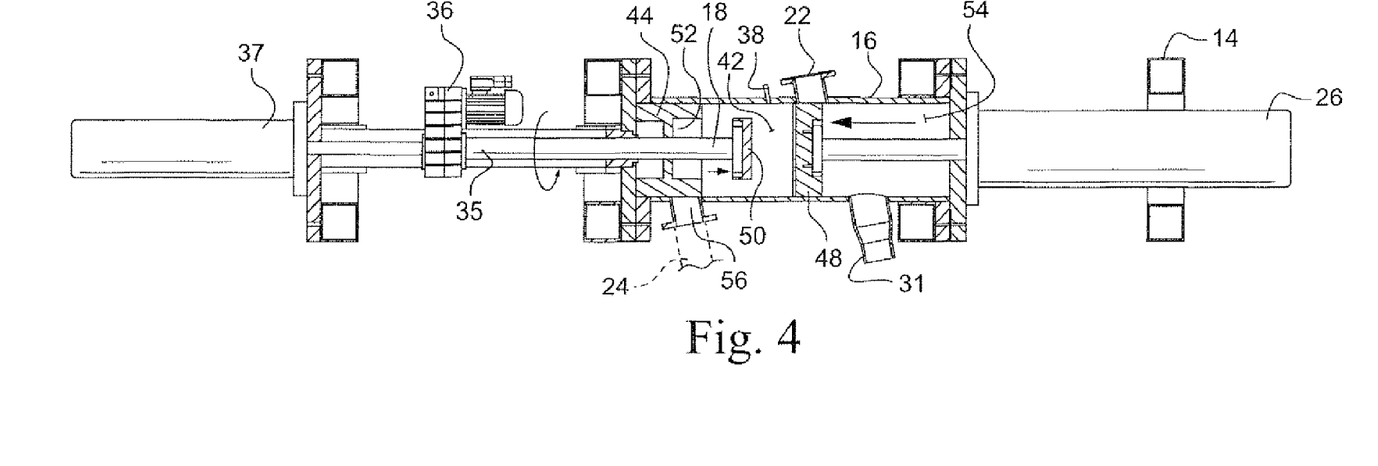

FIG. 4 shows the biomass treatment device 10 with the treatment vessel 16 shown in cross-section and the mixer 20 and piston press 18 are positioned to process, e.g., pre-hydrolyze, the biomass feedstock in the processing chamber. After the biomass feedstock is added to the processing chamber 42, the piston head 48 is advanced to close the inlet 22, as shown by the arrow in FIG. 4. Steam, chemicals, catalysts and other additives are added to the biomass feedstock through the steam inlet 38. Sensors in or on the vessel may monitor the pressure, temperature and other conditions of the biomass feedstock and provide data to an operator and a computer controller regarding the conditions in the vessel. The conditions in the vessel are controlled to conform to the desired recipe for processing the biomass feedstock.

The mixing head 50 may include paddles, blades or a bar, to stir the biomass feedstock and evenly distribute the feedstock, chemicals and liquor in the processing chamber. The mixing head 50 is attached to the rotating shaft 35 driven by the rotating drive 36. The rotating mixing head 50 may be moved axially back and forth by the hydraulic cylinder 37 attached to an end of the shaft 35 of the mixer. The rotation and axial movement of the mixing head stirs the biomass feedstock in the processing chamber to promote uniform reaction and treatment of the feedstock.

Figure 5:
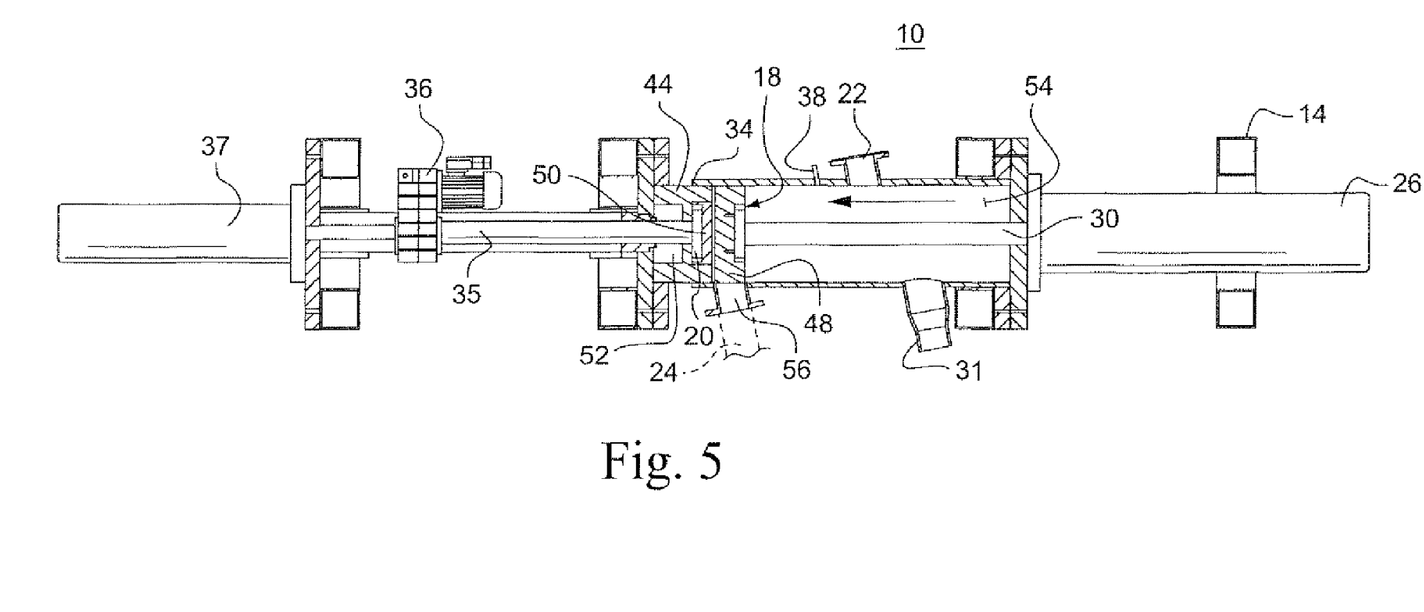

FIG. 5 shows the biomass treatment device 10 with the treatment vessel 16 shown in cross-section and the mixer 20 and piston press 18 are positioned to compress the biomass feedstock loaded in the processing portion 44 of the vessel 10 and screen hemi-cellulosic material through the piston head 48 to the extraction portion 54 of the vessel. After mixing, the mixing head 50 stops rotating and is retracted by the cylinder 37 pulling back the shaft 35. The head retracts into a recess 52 in the sealing seat 44 of the mixing device.

The piston press 18 is advanced by the shaft 30 of the hydraulic cylinder (see arrow in FIG. 5). The piston head of the press compresses the feedstock and squeezes dissolved liquids, e.g. sugars, condensed steam and chemicals from the reacted biomass through a screen-plate 58 (FIG. 6) on the piston head. The pressing hydraulic cylinder 26 may apply 50 to 200 bar to advance the piston press and compress the biomass feedstock into a relatively small disc shape cookie of feedstock. The compression of the feedstock into a cookie forces liquid, chemicals and dissolved hemi-cellulosic material, such as C5 sugars, through the screen plate and into the extraction portion 54 of the vessel, behind the screen at the head of the piston press.

The dissolved hemi-cellulosic material, other dissolved chemicals and fine particles and liquid are extracted from the feedstock, pass through the screen plate and enter the extraction region 54 of the vessel. The dissolved material and liquids drain from the extraction region 54 through the discharge drain 31, which may allow continuous or batch flow of these liquids. The material discharged through the drain 31, particularly the C5 sugars, may be recovered and further processed using known processing vessels and techniques.

The screen plate 58 blocks the flow of fibers and most other solid biomass material of the same size or lager than fibers. The screen plate and piston head form a sliding end wall of the processing chamber 42 and separates that chamber from the extraction region 54. After the fibers and other solid biomass material are compressed into a cookie, the piston press is retracted to release the cookie and expand the processing chamber 42. The mixing head 50 advances from a recess 52 in the sealing seat 44 and into the processing chamber. The mixing head rotates and moves back and forth to crumble and break the cookie into granular pieces of biomass feedstock that remain in the processing chamber for further processing in the chamber or for discharge from the outlet 56.

The granular pieces of the biomass may be further processed in the processing chamber. These further processes may be cycles of hydrolysis reactions, optional washing processes and other steam and chemical treatment processes performed on the biomass feedstock. For example, a wash step may be performed by retracting the piston head to seal the inlet 22 as shown in FIG. 4 and injecting water or other wash liquid through the steam inlet 38 and into the processing chamber 42 of the vessel. The mixing head 50 extends into the processing portion to mix the wash liquid and biomass feedstock. After mixing, the mixing head is retracted into a recess 52 of the sealing seat. The piston press advances through the processing chamber to compress the biomass feedstock into a cookie and allow the wash liquid to pass through the screen to the processing region 42 and out the drain 31. After one or more of the various process steps, e.g., pre-cooking and wash-cycles, the movable mixer blades 50, e.g., agitator, extends into the biomass cookie and rotates to fluff the cookie, e.g., breakup and crumble the cookie. The fluffed, broken up and crumbled biomass feedstock is discharged through outlet 56, which may or may not include a valve, to a separate reactor. The separate reactor 24 may be a steaming gun, flash-hydrolysis vessel, other high pressure reaction vessel for further processing of the pre-cooked biomass feedstock.

The cylindrical sealing seat 44 retracts, e.g., slides, with respect to the cooking vessel 10 expose the feedstock outlet 56. To retract the sealing seat, pins between the seat and vessel may be removed to allow the sealing seat to slide partially out of the vessel and expose the outlet 56. Steam may be injected through steam inlet 38 to transport the biomass from the vessel and to the steam gun 24. The biomass that passes through the outlet 56 has been processed in the vessel 10 to extract at least some of the hemi-cellulosic material, e.g., C5 sugars, that were in the biomass feedstock that entered the vessel through inlet 22.

Figure 6:
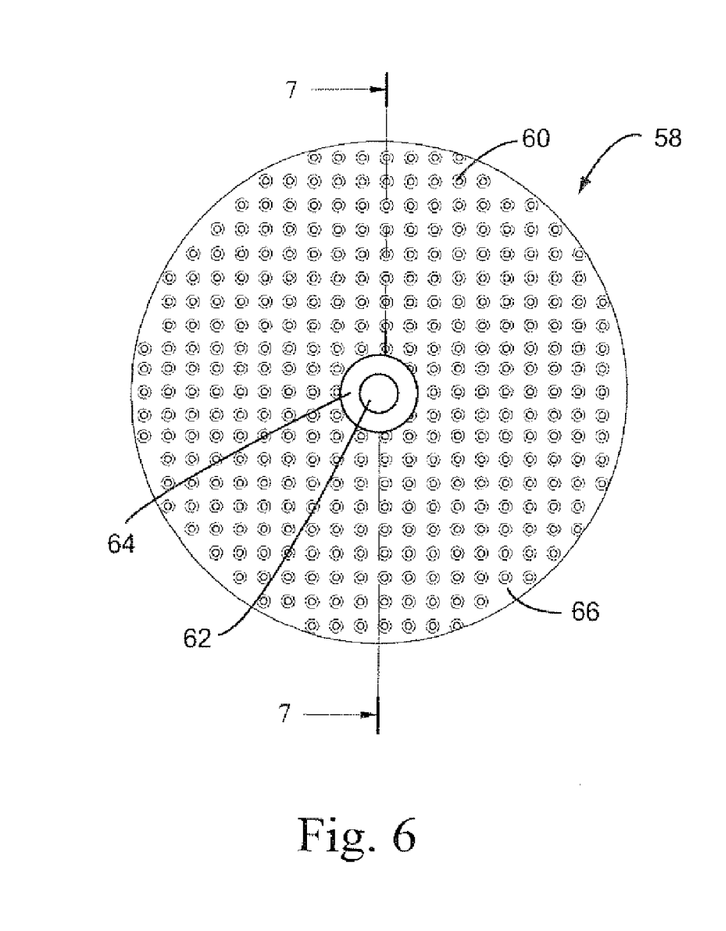
FIG. 6 is a front view of a front face of a piston head showing a circular screen plate, for the biomass treatment device shown in FIG. 1.
Figure 7:
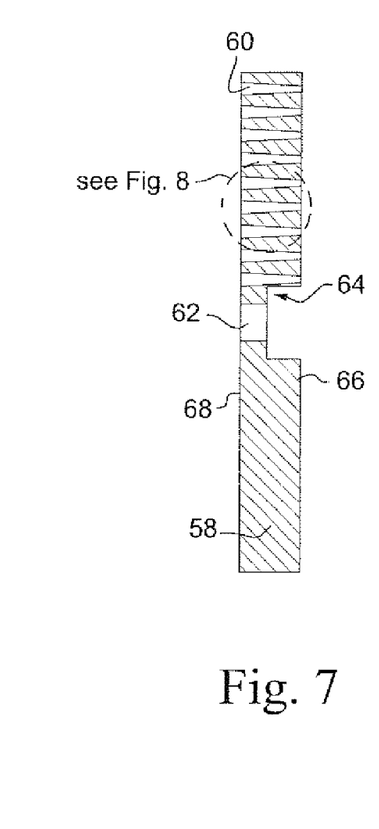
FIG. 7 shows the screen plate in cross-section taken along line 7-7 in FIG. 6.
Figure 8:
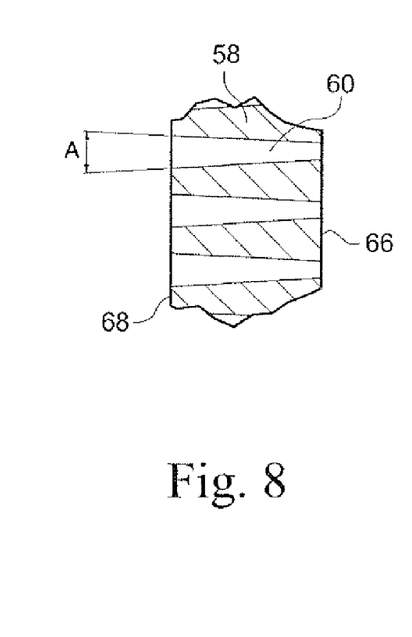
FIG. 8 shows an enlarged cross-sectional view of a screen plate portion marked 8 in FIG. 7.

FIG. 6 shows the front face 66 of the piston press 18 on which is a circular screen plate 58. The screen plate may form the front portion of a piston head of the piston press. FIG. 7 shows the screen plate 58 in cross-section taken along line 7-7 in FIG. 6. FIG. 8 shows an enlarged view of the portion marked 8 on the screen plate 58 cross-section shown in FIG. 7.

The screen plate 58 is perforated with holes 60 that may be of various configurations such as circular openings, slotted openings, wherein the slots are straight or arched, and other opening shapes that perforate the screen plate 58. Similarly, the arrangement of holes 60 on the screen plate 58 may be rows and columns, circular arrays of holes, other symmetrical and asymmetrical arrays of holes. Preferably, the holes are distributed over the entire area of the front face 66 of the piston head. However, a center of the piston head may include a center large opening 62 to receive a bolt or other attachment device to secure the screen plate and piston head to the shaft 30 (see FIG. 5). An annular recess 64 surrounding the large opening 62 forms a seat, a bolt head and avoids having the bolt head extend axially beyond the front face of the screen plate.

As shown in FIGS. 7 and 8, the holes 60 for the screen plate 58 may be conical having a narrow diameter opening at the front face 66 and a large diameter opening at the rear face 68 of the piston head 46. The conical holes may expand at an angle (A) of 10 to 30 degrees, for example. The conical holes 60 promote the flow of dissolved hemi-cellulosic and other dissolved material through the holes and avoid clogging the holes. The narrow end of the holes 60 may have a diameter of, for example, 2 to 15 millimeters (mm). The shape, size and arrangement of holes in the screen plate 58 may be selected depending on the biomass feedstock being processed and, particularly, the fiber size of the feedstock. The holes in the screen plate should block passage of fibers in the feedstock and allow passage of liquids and small dissolved material in the processing chamber.

Figure 9:
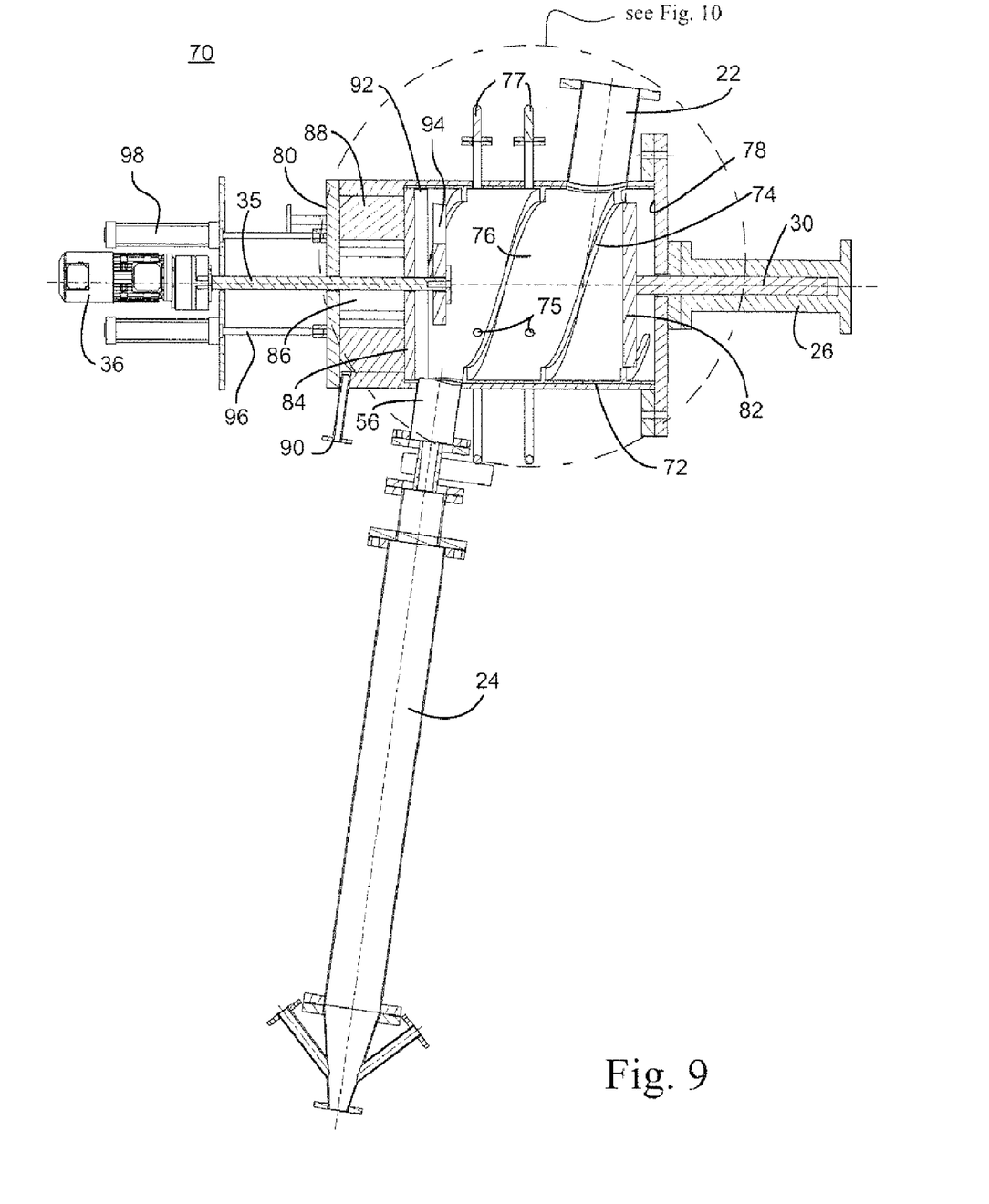
FIG. 9 is a side cross-sectional view of a second embodiment of a biomass treatment device having a treatment vessel with interior spiral flights.
Figure 10:
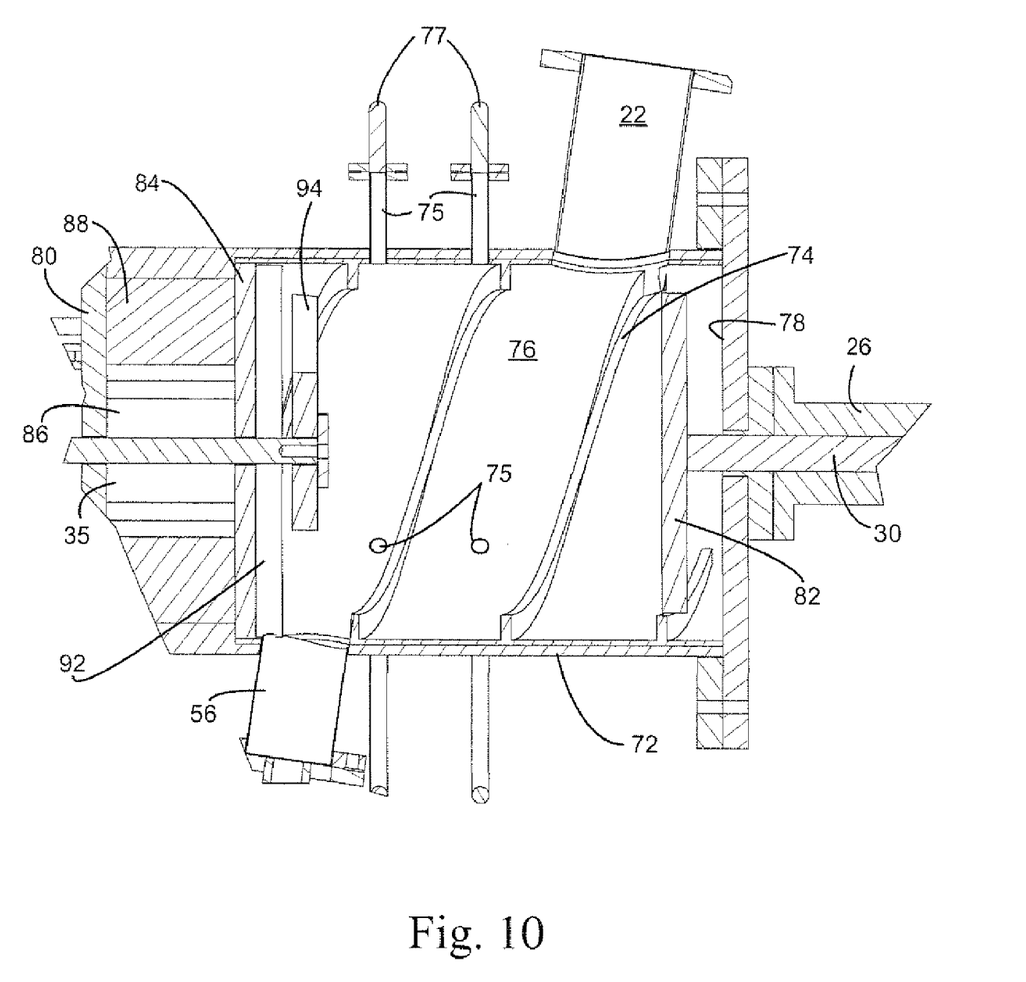
FIG. 10 is an enlarged cross-sectional view of the treatment vessel shown in FIG. 9.
Figure 11:
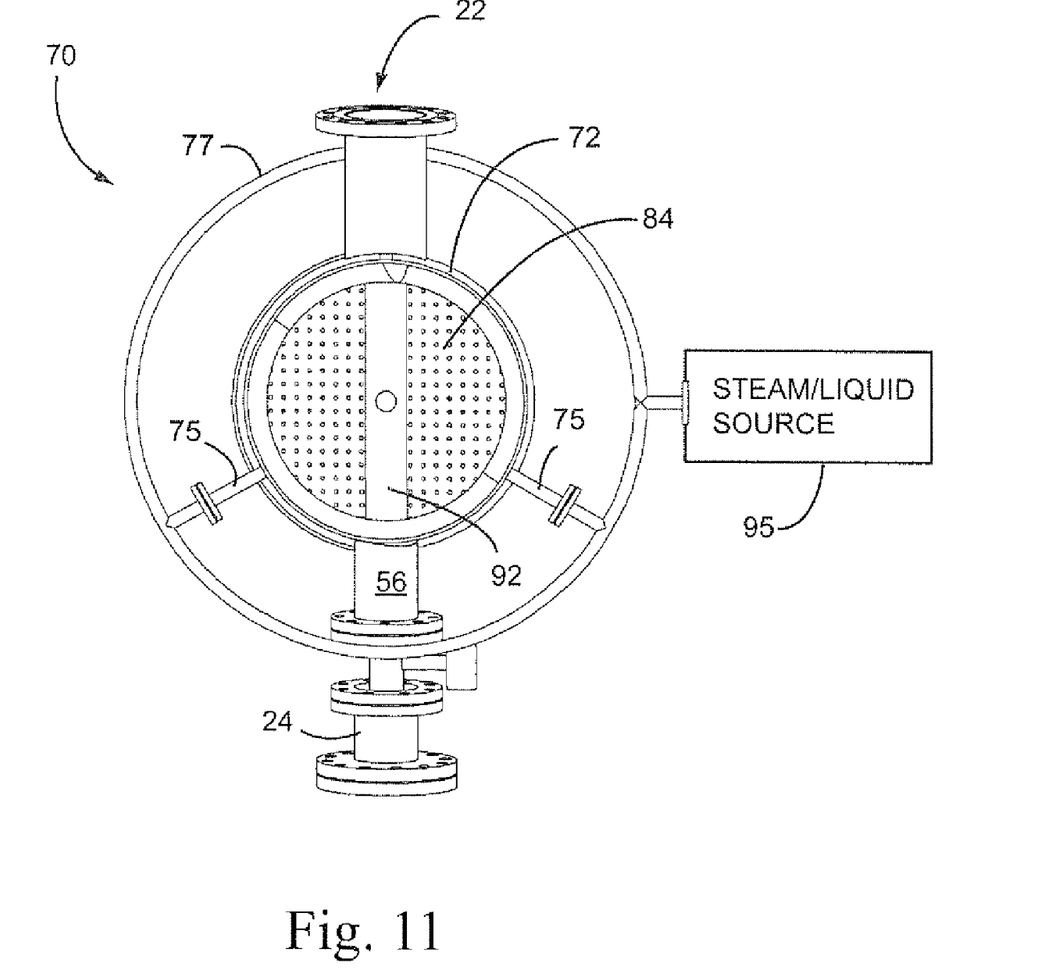
FIG. 11 is a cross-sectional diagram taken along a first end of the vessel shown in FIG. 9 and showing an opposite end of the vessel.
Figure 12:
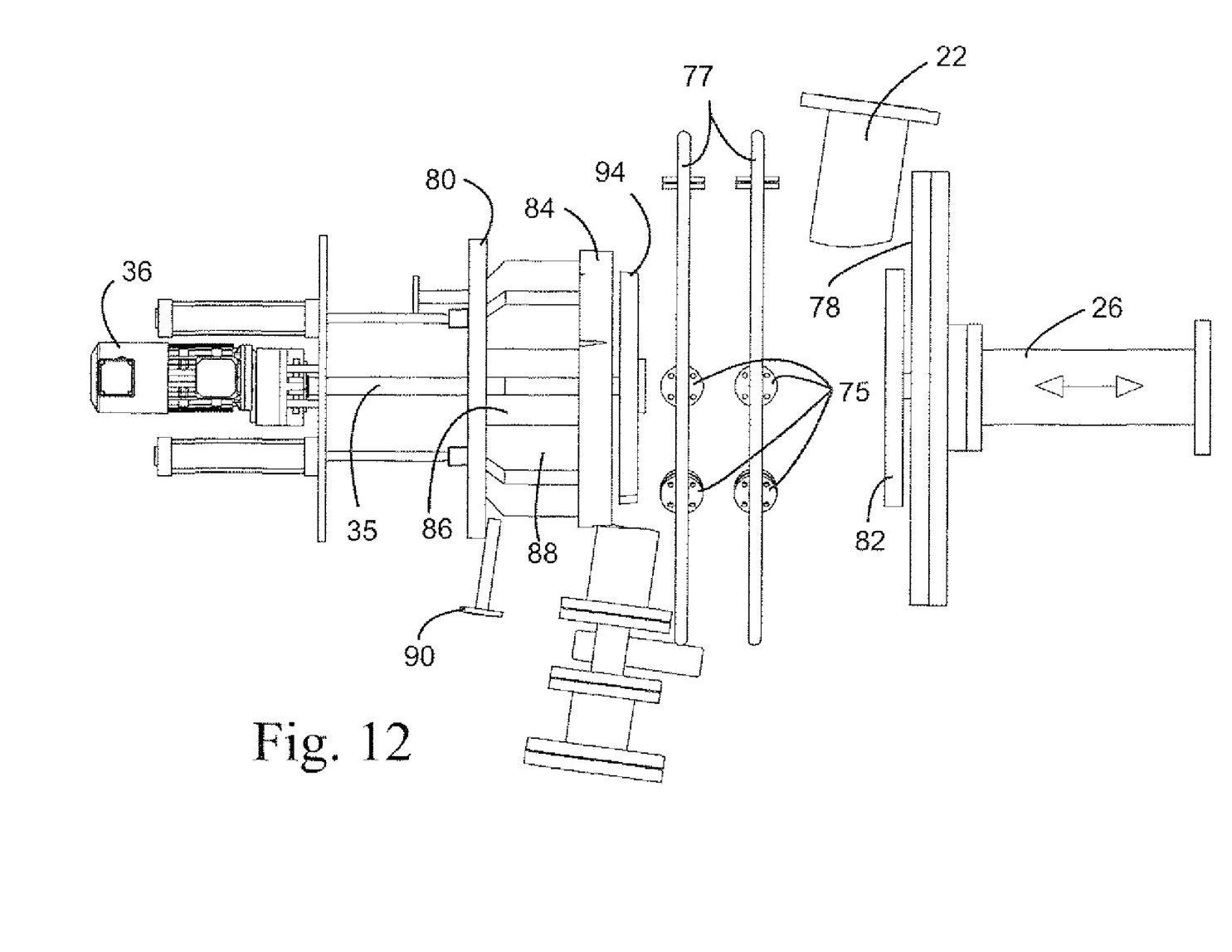
FIG. 12 is an exploded side view of components of the biomass treatment device shown in FIG. 9.

FIG. 9 is a side cross-sectional view of a second embodiment of a biomass treatment device 70 having a treatment vessel 72 with interior spiral flights 74 in the processing chamber 76 of the vessel. FIG. 10 is an enlarged cross-sectional view of the treatment vessel 72, and FIG. 11 is a cross-sectional diagram taken along a first end 78 of the vessel and showing a view of the opposite end 80 of processing chamber 76 in vessel 72. FIG. 12 is an exploded side view of components of the treatment device 70. In FIGS. 9 to 12, the same reference numbers as used in FIGS. 1 to 9 have been used to refer to common components in the biomass cooking device 70 and device 10.

The spiral flights 74 in the cooking device 70 assist in moving the biomass feedstock through the processing portion 76 of the vessel 72. The spiral flights may be a helical ridge of a metal strip on the outer inside surface of the processing chamber 76 of the vessel. The spiral flights 74 may be particularly useful for low consistency biomass feedstock.

Steam, chemical additives and catalysts, wash liquid and other liquids may be added through a single port or an array of inlet ports 75 to the processing chamber of the vessel. The inlet ports 75 receive the steam and liquid from annular distribution conduits 77 extending around the outside of the vessel and coupled to sources 95 for the steam and liquids. After each of the processing steps, e.g., pre-hydrolysis, hydrolysis processing and washing, as part of the washing sequence, the piston compresses the feedstock and squeeze dissolved liquids from the washed biomass through the screen-plate. (multiple wash-cycles are possible).

The piston head 82 is a solid circular disc attached to the shaft 48 that is driven by the shaft 30 of the pressing hydraulic cylinder. Optionally, the piston head may have perforation holes to drain the hydrolyzate and liquid to behind the piston head while the front of the piston head is being pressed against the feedstock. The piston head 82 moves axially through the spiral flights 74 to compress the feedstock into a cookie. Due to flights 74, the piston head 82 does not form a complete seal across a cross-section of the vessel as does the piston head 46 in FIGS. 1 to 8. The piston head 74 may have an outer diameter approximately the same as the inside ridge of the flights 74. The piston head 82 does not extend radially outward into the annular area of the flights. As the piston head compresses the biomass feedstock, some feedstock will flow around the outer rim of the piston head and through the flights. The processing chamber 76 includes the volume between the first end 78 of the vessel and a screen plate 84 in the vessel. The processing chamber does not have an end at the piston head, as does the embodiment shown in FIGS. 1 to 8.

As the piston head 82 advances to screen plate 84 of the vessel, the hemi-cellulosic and other materials dissolved from the biomass feedstock are extracted through a circular disc shaped screen plate 84. The screen plate defines a wall between the processing chamber 80 and extraction region 86, e.g., chamber, of the vessel 72. The screen plate 84 includes an arrangement of holes such as shown in FIGS. 7 and 8. The hemi-cellulosic, other dissolved material and liquid extracted through the screen plate are discharged from the extraction region through a drain 90.

The front face of the screen plate 84 has a slot 92 to receive the paddle 94 or other stirring end of the mixer. The slot has a shape to conform to the paddle to allow the paddle to be retracted into the screen plate and not extend beyond the surface of the screen plate. The piston head 82 advances towards the screen plate to compress the biomass feedstock into a cookie formed between the piston head and screen plate.

The circular screen plate 84 is supported by an annular array of planar braces 88 extending axially through the extraction region and supported by a circular end plate at 80 of the vessel. The ends of the braces 88 are attached to a circular plate 80 that forms a second end of the vessel. The outside end of the plate 80 may be attached to support columns 96 for hydraulic cylinders 98 that axially move the mixer shaft 35 that advances the mixing paddle 94 in the processing chamber of the vessel.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

We claim:

1. A biomass treatment system comprising:
   a treatment vessel having an biomass inlet configured to receive biomass material to a processing chamber of the vessel, a biomass outlet configured to discharge from the processing chamber the biomass material processed in the vessel, an extraction region of the vessel and a liquids outlet to the extraction region to discharge dissolved hemi-cellulosic material extracted from the biomass material in the processing chamber;
   a piston press in the treatment vessel defining a moveable wall of the processing chamber, wherein the piston press moves to reduce the processing chamber and thereby compress the biomass material, and
   a screen plate in the vessel forming a barrier between the processing chamber and an extraction region of the treatment vessel, the screen plate having apertures to pass the dissolved hemi-cellulosic material through the screen plate from the processing chamber to the extraction region, and
   a heat energy inlet to the processing chamber and configured to add sufficient heat to cause the biomass material to undergo hydrolysis in the processing chamber.

2. The biomass treatment system of claim 1 wherein the piston press includes a piston head substantially filling a cross-sectional area of the vessel.

3. The biomass treatment system of claim 1 further comprising a hydraulic cylinder coupled to a shaft attached to the piston press, wherein the hydraulic cylinder is outside of the vessel and the shaft extends into the vessel.

4. The biomass treatment system of claim 1 wherein the vessel has a circular cross-section, the piston press includes a cylindrical piston head and the screen plate is circular.

5. The biomass treatment system of claim 1 wherein the screen plate is separate of the piston press.

6. A biomass treatment system comprising:
   a treatment vessel having an biomass inlet configured to receive biomass material to a processing chamber of the vessel, a biomass outlet configured to discharge from the processing chamber the biomass material processed in the vessel, an extraction region of the vessel and a liquids outlet to the extraction region to discharge dissolved hemi-cellulosic material extracted from the biomass material in the processing chamber;
   a piston press in the treatment vessel defining a moveable wall of the processing chamber, wherein the piston press moves to reduce the processing chamber and thereby compress the biomass material;

a screen plate in the vessel forming a barrier between the processing chamber and an extraction region of the treatment vessel, the screen plate having apertures to pass the dissolved hemi-cellulosic material through the screen plate from the processing chamber to the extraction region; and a steam inlet to the processing chamber configured to receive steam under a pressure of at least 1.5 bar gauge.

7. A biomass treatment system comprising:

a treatment vessel having an biomass inlet configured to receive biomass material to a processing chamber of the vessel, a biomass outlet configured to discharge from the processing chamber the biomass material processed in the vessel, an extraction region of the vessel and a liquids outlet to the extraction region to discharge dissolved hemi-cellulosic material extracted from the biomass material in the processing chamber;

a piston press in the treatment vessel defining a moveable wall of the processing chamber, wherein the piston press moves to reduce the processing chamber and thereby compress the biomass material, and a screen plate in the vessel forming a barrier between the processing chamber and an extraction region of the treatment vessel, the screen plate having apertures to pass the dissolved hemi-cellulosic material through the screen plate from the processing chamber to the extraction region a treatment vessel having an biomass inlet adapted to receive biomass material to a processing chamber of the vessel, a biomass outlet adapted to discharge from the processing chamber the biomass material processed in the vessel, an extraction region of the vessel and a liquids outlet to the extraction region to discharge dissolved hemi-cellulosic material extracted from the biomass material in the processing chamber, wherein the screen plate is on a front surface of the piston press, the processing chamber is in front of the piston press and the extraction region is behind the piston press.

8. A biomass treatment system comprising:

a cylindrical treatment vessel having an biomass inlet configured to receive biomass material into a processing chamber of the vessel, a biomass outlet configured to discharge from the processing chamber the biomass material processed in the vessel, and a liquids outlet configured to discharge from an extraction region of the vessel dissolved hemi-cellulosic material extracted from the biomass material in the processing chamber;

a piston in the treatment vessel and forming a moveable end to the processing chamber, wherein the piston moves to reduce a volume of the processing chamber and thereby compress the biomass material in processing chamber;

a screen plate in the vessel between the processing chamber and the extraction region, wherein the screen plate has apertures to pass the dissolved hemi-cellulosic material from the processing chamber to the extraction region, and a heat energy inlet to the processing chamber and configured to add sufficient heat to cause the biomass material to undergo hydrolysis in the processing chamber.

9. The biomass treatment system of claim 8 wherein the piston conforms to a cross-sectional area of the vessel.

10. The biomass treatment system of claim 8 wherein the vessel includes spiral flights on an outer wall of the processing chamber and the piston extends coaxially through the flights.

11. The biomass treatment system of claim 8 further comprising a hydraulic cylinder coupled to a shaft attached to the piston, wherein the hydraulic cylinder is outside of the vessel and the shaft extends in the vessel.

12. The biomass treatment system of claim 8 wherein the screen plate is separate of the piston.

13. A biomass treatment system comprising:

a cylindrical treatment vessel having an biomass inlet configured to receive biomass material into a processing chamber of the vessel, a biomass outlet configured to discharge from the processing chamber the biomass material processed in the vessel, and a liquids outlet configured to discharge from an extraction region of the vessel dissolved hemi-cellulosic material extracted from the biomass material in the processing chamber;

a piston in the treatment vessel and forming a moveable end to the processing chamber, wherein the piston moves to reduce a volume of the processing chamber and thereby compress the biomass material in processing chamber;

a screen plate in the vessel between the processing chamber and the extraction region, wherein the screen plate has apertures to pass the dissolved hemi-cellulosic material from the processing chamber to the extraction region, and a steam inlet to the processing chamber and configured to receive steam under a pressure of at least 1.5 bar gauge.

14. A biomass treatment system comprising:

a cylindrical treatment vessel having an biomass inlet configured to receive biomass material into a processing chamber of the vessel, a biomass outlet configured to discharge from the processing chamber the biomass material processed in the vessel, and a liquids outlet configured to discharge from an extraction region of the vessel dissolved hemi-cellulosic material extracted from the biomass material in the processing chamber;

a piston in the treatment vessel and forming a moveable end to the processing chamber, wherein the piston moves to reduce a volume of the processing chamber and thereby compress the biomass material in processing chamber, and a screen plate in the vessel between the processing chamber and the extraction region, wherein the screen plate has apertures to pass the dissolved hemi-cellulosic material from the processing chamber to the extraction region, wherein the screen plate is on a front surface of the piston, the processing chamber is in front of the piston and the extraction region is behind the piston.

\* \* \* \* \*